(12) United States Patent
Nakanishi et al.

(10) Patent No.: US 7,324,347 B2
(45) Date of Patent: Jan. 29, 2008

(54) MEMORY CARD

(75) Inventors: Seiji Nakanishi, Osaka (JP); Takashi Torii, Osaka (JP); Noriaki Furuta, Shiga (JP); Takahiro Sakamoto, Osaka (JP); Masayoshi Yano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/182,959

(22) Filed: Jul. 15, 2005

(65) Prior Publication Data

US 2005/0254219 A1    Nov. 17, 2005

Related U.S. Application Data

(62) Division of application No. 10/439,648, filed on May 16, 2003, now Pat. No. 6,922,343, which is a division of application No. 10/049,584, filed as application No. PCT/JP00/05601 on Aug. 21, 2000, now Pat. No. 6,580,615.

(30) Foreign Application Priority Data

Aug. 24, 1999  (JP)  .................................. 11-236734

(51) Int. Cl.
*H05K 7/00*    (2006.01)

(52) U.S. Cl. ...................... 361/737; 361/781; 235/492; 439/945; 439/946; 439/188

(58) Field of Classification Search ................ 361/737, 361/730, 728, 752, 748, 756, 736, 781; 235/492, 235/441, 487, 488; 439/188, 630, 159, 945, 439/946, 76.1, 943, 160; 174/521
See application file for complete search history.

(56) References Cited

U.S. PATENT DOCUMENTS

| 4,397,513 | A |   | 8/1983 | Clark et al. |
|---|---|---|---|---|
| 4,737,602 | A | * | 4/1988 | Yamamoto ................ 200/16 D |
| 5,016,086 | A |   | 5/1991 | Inoue et al. |
| 5,016,123 | A | * | 5/1991 | Karsh .......................... 360/69 |
| 5,350,945 | A | * | 9/1994 | Hayakawa .................. 257/679 |
| 5,402,385 | A |   | 3/1995 | Ozeki et al. |

(Continued)

FOREIGN PATENT DOCUMENTS

EP            0533463           3/1993

(Continued)

*Primary Examiner*—Dean A. Reichard
*Assistant Examiner*—Dameon E. Levi
(74) *Attorney, Agent, or Firm*—RatnerPrestia

(57) ABSTRACT

A memory card includes: a main body of the memory card in which a notched section is formed; a semiconductor memory; and a write/nonwrite setting element for setting the write/nonwrite state of data in the semiconductor memory, the write/nonwrite setting element being slidably fitted in the notched section, wherein the main body of the memory card includes an upper main body and a lower main body; at least one of the upper main body and the lower main body has an elastic guide formed within the notched section; the write/nonwrite setting element slides along the elastic guide so as to set the write/nonwrite state of the data in the semiconductor memory; and the elastic guide has an engagement portion for engagedly stopping the write/nonwrite setting element so as to select the position of the write/nonwrite setting element with respect to the elastic guide.

3 Claims, 8 Drawing Sheets

U.S. PATENT DOCUMENTS

| | | | |
|---|---|---|---|
| 5,539,600 A | 7/1996 | Lee et al. | |
| 6,145,023 A | 11/2000 | Iwasaki | |
| 6,170,743 B1 * | 1/2001 | Okaue et al. | 235/380 |
| 6,247,947 B1 * | 6/2001 | Knoernschild et al. | 439/159 |
| 6,399,906 B1 * | 6/2002 | Sato et al. | 200/61.59 |
| 6,402,529 B2 * | 6/2002 | Saito et al. | 439/74 |
| 6,503,092 B1 * | 1/2003 | Sato | 439/159 |
| 6,557,761 B1 * | 5/2003 | Oya et al. | 235/441 |
| 6,580,615 B1 * | 6/2003 | Nakanishi et al. | 361/737 |
| 6,590,778 B1 * | 7/2003 | Hojo et al. | 361/737 |
| 6,638,087 B1 * | 10/2003 | Takada et al. | 439/188 |
| 6,692,276 B1 * | 2/2004 | Abe et al. | 439/188 |
| 6,699,053 B2 * | 3/2004 | Kuroda | 439/218 |
| 6,709,281 B2 * | 3/2004 | Shishikura et al. | 439/188 |
| 6,719,589 B2 * | 4/2004 | Nishio et al. | 439/630 |
| 6,739,515 B1 * | 5/2004 | Wallace | 235/492 |
| 6,786,417 B1 * | 9/2004 | Kondo et al. | 235/492 |
| 6,816,386 B2 * | 11/2004 | Oguchi et al. | 361/769 |
| 6,848,923 B2 * | 2/2005 | Takada et al. | 439/188 |
| 6,922,343 B2 * | 7/2005 | Nakanishi et al. | 361/737 |
| 6,932,652 B1 * | 8/2005 | Chen | 439/630 |
| 6,947,289 B2 * | 9/2005 | Nakanishi et al. | 361/737 |

FOREIGN PATENT DOCUMENTS

| | | |
|---|---|---|
| EP | 0887742 | 12/1998 |
| JP | 62-124685 | 6/1987 |
| JP | 63-045658 | 2/1988 |
| JP | 01-279481 | 11/1989 |
| JP | 02-208884 | 8/1990 |
| JP | 04-253123 | 9/1992 |
| JP | 06-337819 | 12/1994 |
| JP | 08-216570 | 8/1996 |

\* cited by examiner (a)

(b)

(a)

(b)

MEMORY CARD

This application is a divisional of U.S. Pat. application Ser. No. 10/439,648 filed May 16, 2003 now U.S. Pat. No. 6,922,343 which is a divisional of U.S. Pat. application Ser. No. 10/049,584 filed Feb. 13, 2002 now U.S. Pat. No. 6,580,615 which is a U.S. National Phase Application of PCT International Application PCT/JP00/05601 filed Aug. 21, 2000.

TECHNICAL FIELD

The present invention relates to a memory card incorporating a write/nonwrite setting means for preventing erroneous erasure or erroneous rewriting of a stored content.

BACKGROUND ART

Conventionally, in some memory cards, a reflective sheet, a switch, or a setting element which is largely exposed from a main body have been used as a write/nonwrite setting means.

FIG. 12 is a perspective view showing a conventional memory card 1100 incorporating a write/nonwrite setting means which is realized by a reflective sheet 33. In FIG. 12, reference numeral 31 denotes a main body of the memory card, reference numeral 32 denotes a terminal which is integrally formed with the main body 31 of the memory card, and reference numeral 33 denotes a reflective sheet.

Inside the main body 31 of the memory card, a semiconductor memory (not shown) in which a content is rewritable is provided. A device (not shown) which is electrically connected to the semiconductor memory through the terminal 32 reads or rewrites data stored in the semiconductor memory. In this example, the reflective sheet 33 is used as the write/nonwrite setting means. The write/nonwrite state of the memory card is set by applying the reflective sheet 33 onto a predetermined position on the main body 31 of the memory card or peeling the reflective sheet 33 off from the predetermined position. The device detects the write/nonwrite state by detecting the reflective state at the predetermined position on the main body 31 of the memory card by using a photocoupler or the like.

FIG. 13 is a perspective view showing a conventional memory card 1200 incorporating a write/nonwrite setting means which is realized by a switch 43. In FIG. 13, reference numeral 41 denotes a main body of the memory card, reference numeral 42 denotes a terminal which is integrally formed with the main body 41 of the memory card, and reference numeral 43 denotes a switch.

Inside the main body 41 of the memory card, a semiconductor memory (not shown) in which a content is rewritable is provided. A device (not shown) which is electrically connected to the semiconductor memory through the terminal 42 reads or rewrites data stored in the semiconductor memory. In this example, the switch 43 is used as the write/nonwrite setting means. The write/nonwrite state of the memory card is set by the switching of the switch 43. The device electrically detects the setting of the switch 43.

In such memory cards, a more compact and thinner main body of the memory card, and more simple manipulation of a write/nonwrite setting means are concurrently required.

The conventional memory card 1100, which incorporates a write/nonwrite setting means realized by the reflective sheet 33, does not have a mechanical structure for the write/nonwrite setting means. Thus, the reflective sheet 33 is effective in achieving a more compact and thinner main body 31 of the memory card. However, manipulation of the write/nonwrite setting means is inconvenient because the write/nonwrite state of the memory card is set by the application and the peeling off of the reflective sheet 33.

In the conventional memory card 1200 which incorporates a write/nonwrite setting means realized by the switch 43, the write/nonwrite state of the memory card is set by the switching of the switch 43. Thus, manipulation for setting the write/nonwrite state of the memory card is simple. However, there is a limit to a decrease in the size and thickness of the main body 41 of the memory card because the main body 41 of the memory card incorporates a switch.

The present invention was conceived for the purpose of providing a memory card including a write/nonwrite setting means in which setting manipulation is simple, and with which the size and thickness of the main body of the memory card can be decreased.

DISCLOSURE OF THE INVENTION

A memory card according to the present invention includes: a main body of the memory card in which a notched section is formed; a semiconductor memory in which data can be at least written: a terminal provided in the main body of the memory card for electrically connecting the semiconductor memory to an external device; and a write/nonwrite setting element for setting the write/nonwrite state of the data in the semiconductor memory, the write/nonwrite setting element being slidably fitted in the notched section, wherein the main body of the memory card includes an upper main body and a lower main body; at least one of the upper main body and the lower main body has an elastic guide formed within the notched section; the write/nonwrite setting element is slidably fitted in the elastic guide and is sandwiched between the upper main body and the lower main body; the write/nonwrite setting element is positioned such that a portion of the write/nonwrite setting element covers a portion of the notched section; the write/nonwrite setting element slides along the elastic guide so as to set the write/nonwrite state of the data in the semiconductor memory; and the elastic guide has an engagement portion for engagedly stopping the write/nonwrite setting element so as to select the position of the write/nonwrite setting element with respect to the elastic guide, whereby the above objective is achieved.

The engagement portion may include a protrusion which is formed so as to engagedly stop the write/nonwrite setting element; and the write/nonwrite setting element may ride over the protrusion so as to be engagedly stopped at one of the opposite ends of the elastic guide, thereby selecting a position of the notched section which is covered with the write/nonwrite setting element.

The engagement portion may include a first engagement portion which is formed by a protrusion or a cavity; the write/nonwrite setting element may include a second engagement portion which is formed by a cavity or a protrusion; and the second engagement portion may be engagedly stopped by the first engagement portion, whereby the write/nonwrite setting element may select a position of the notched section which is covered with the write/nonwrite setting element.

One of the upper main body and the lower main body may have a slit which is formed in the elastic guide; and the write/nonwrite setting element may fit in the slit.

The write/nonwrite setting element may include: a manipulation portion which covers the notched section so as to achieve setting of the write/nonwrite state and which is used as a manually-operated shift knob; an anti-disengagement portion which is fitted in the slit; and a slide contact portion which connects the manipulation portion with the anti-disengagement portion and which slidably contacts the elastic guide.

The other of the upper main body and the lower main body may have a reentrant groove at a position such as to face the slit; and the write/nonwrite setting element may fit in the slit and the reentrant groove.

One of the upper main body and the lower main body may have a labeling region on which a label is attached so as to cover the slit.

At least one of the upper main body and the lower main body may have a reentrant groove which is formed so as to fit with the write/nonwrite setting element.

Each of the upper main body and the lower main body may have a reentrant groove which is formed so as to fit with the write/nonwrite setting element.

The memory card may further include a switch for electrically switching the write/nonwrite state of the data, the switch being provided inside the main body of the memory card, wherein: the switch may have an activation portion which is provided so as to extend from the switch toward the write/nonwrite setting element; and the activation portion may electrically switch the write/nonwrite state of the data in response to a sliding movement of the write/nonwrite setting element.

The memory card may further include a contact point for electrically switching the write/nonwrite state of the data, the contact point being provided inside the main body of the memory card, wherein the write/nonwrite setting element may have a contact piece provided at a position corresponding to the contact point.

The memory card may further include a print substrate on which the semiconductor memory is mounted, wherein the contact point may be formed on the print substrate.

The elastic guide may be formed such that the elastic force of the elastic guide is affected in a direction from the contact piece to the contact point.

The upper main body and the lower main body may form a slide hole within the notched section; the elastic guide may include a groove formed within the slide hole in at least one of the upper main body and the lower main body; the write/nonwrite setting element may have a fitting portion which is inserted into the slide hole and is fitted in the groove; the fitting portion may include a maximum width section which has a width greater than a width of the slide hole such that the fitting portion can be inserted into the slide hole by means of elastic deformation of the upper main body and the lower main body; and the engagement portion may be formed in the groove.

A tip section of the fitting portion may have a width smaller than that of the slide hole; the fitting portion may have an inclined face extending from the tip section to the maximum width section; and the write/nonwrite setting element may be inserted in the slide hole while the inclined face expands the slide hole until the fitting portion is fitted into the groove, whereby the write/nonwrite setting element may be attached to the main body of the memory card.

BEST MODE FOR CARRYING OUT THE INVENTION

Embodiment 1

Hereinafter, embodiment 1 of the present invention is described with reference to the drawings.

Figure 1:
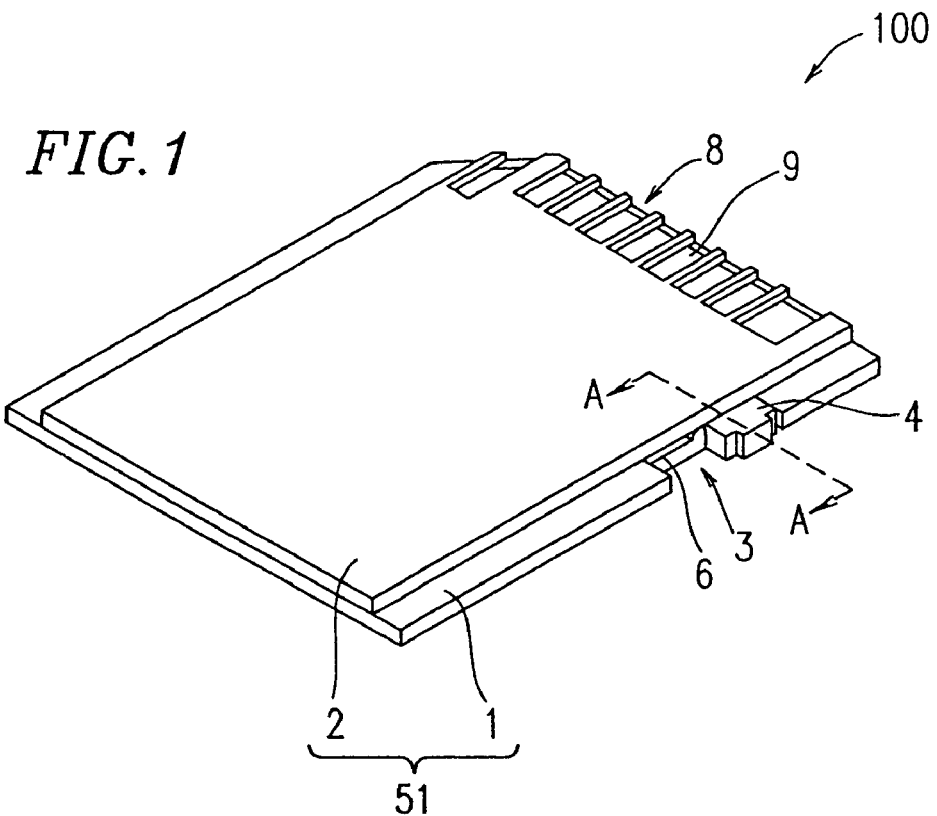
FIG. 1 is a perspective view showing a lower surface side of an assembled memory card according to embodiment 1 of the present invention.
Figure 2:
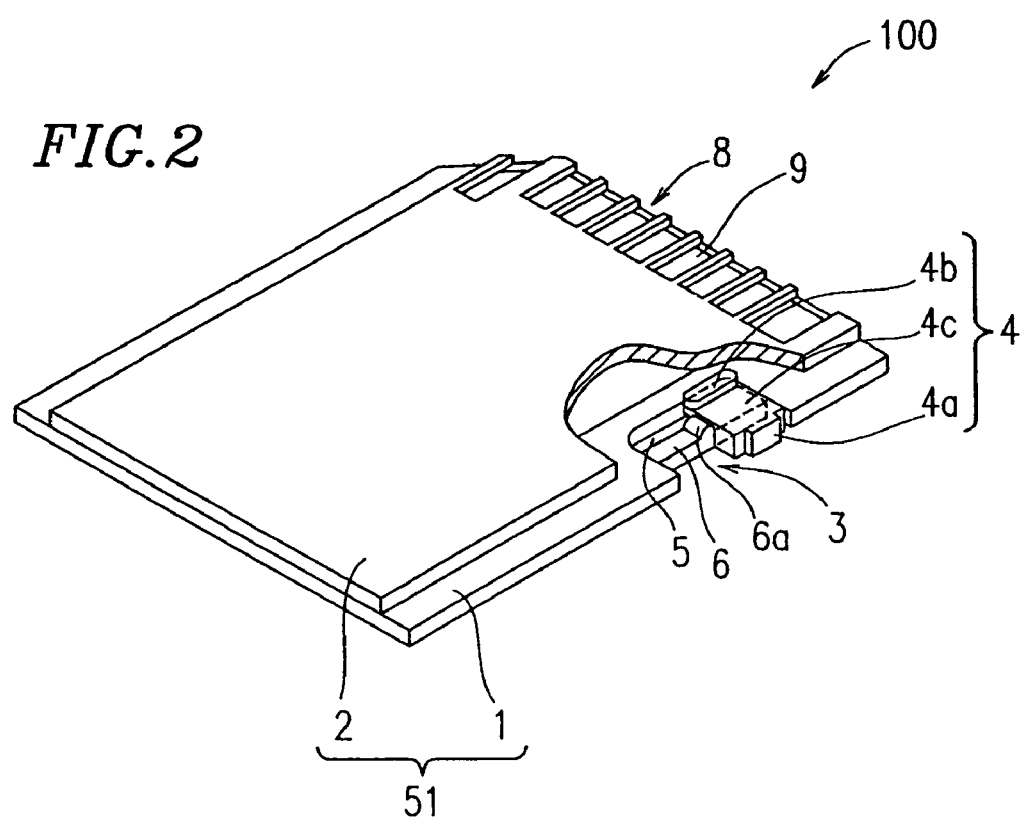
FIG. 2 is a perspective view showing the memory card according to embodiment 1 of the present invention, in which a lower main body is partially cut away.
Figure 3:
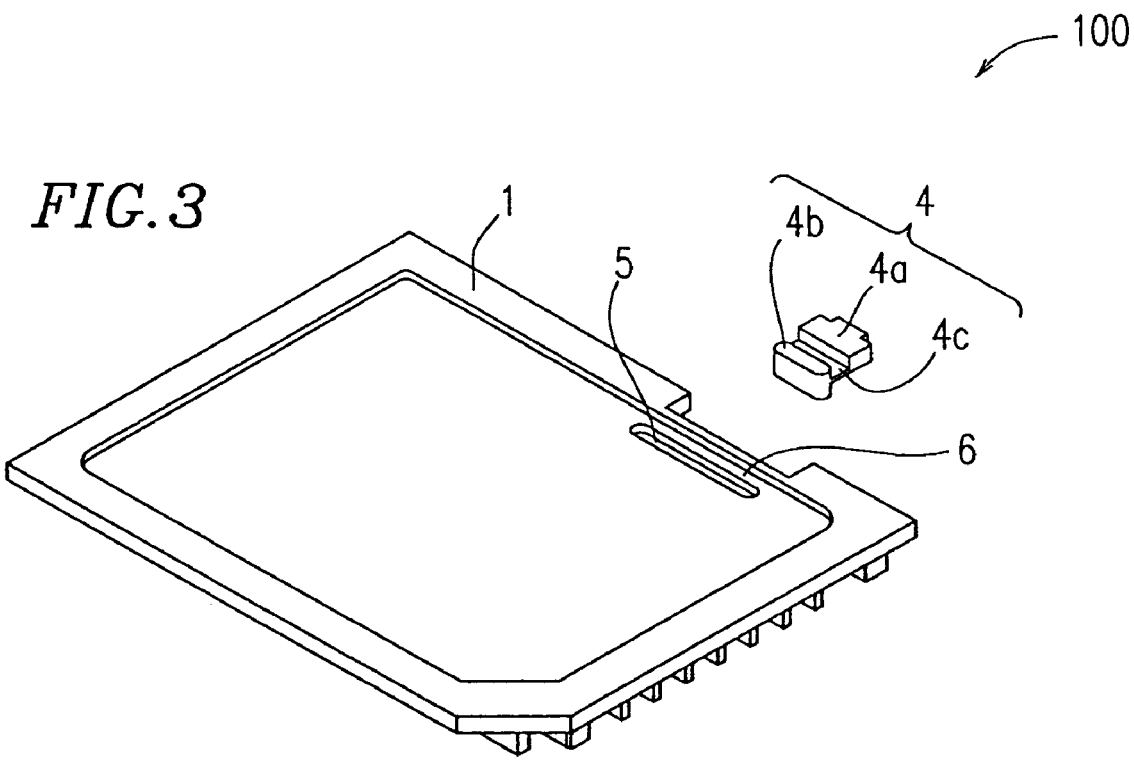
FIG. 3 is a perspective view showing an upper surface side of a partially-exploded memory card according to embodiment 1 of the present invention.
Figure 4:
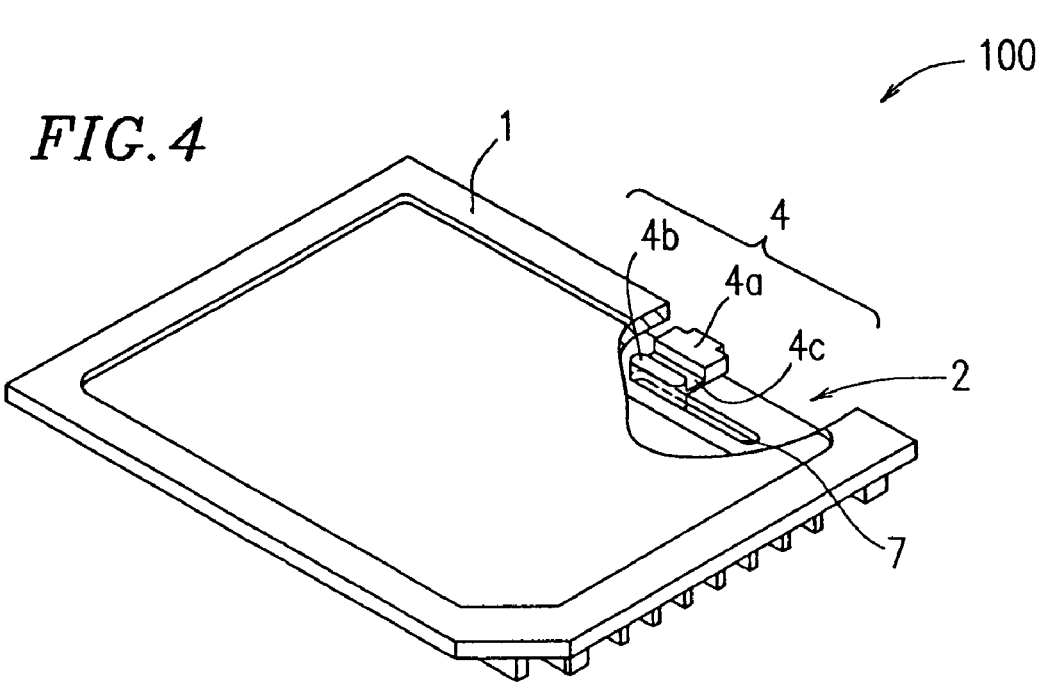
FIG. 4 is a perspective view showing the memory card according to embodiment 1 of the present invention, in which an upper main body is partially cut away.
Figure 5:
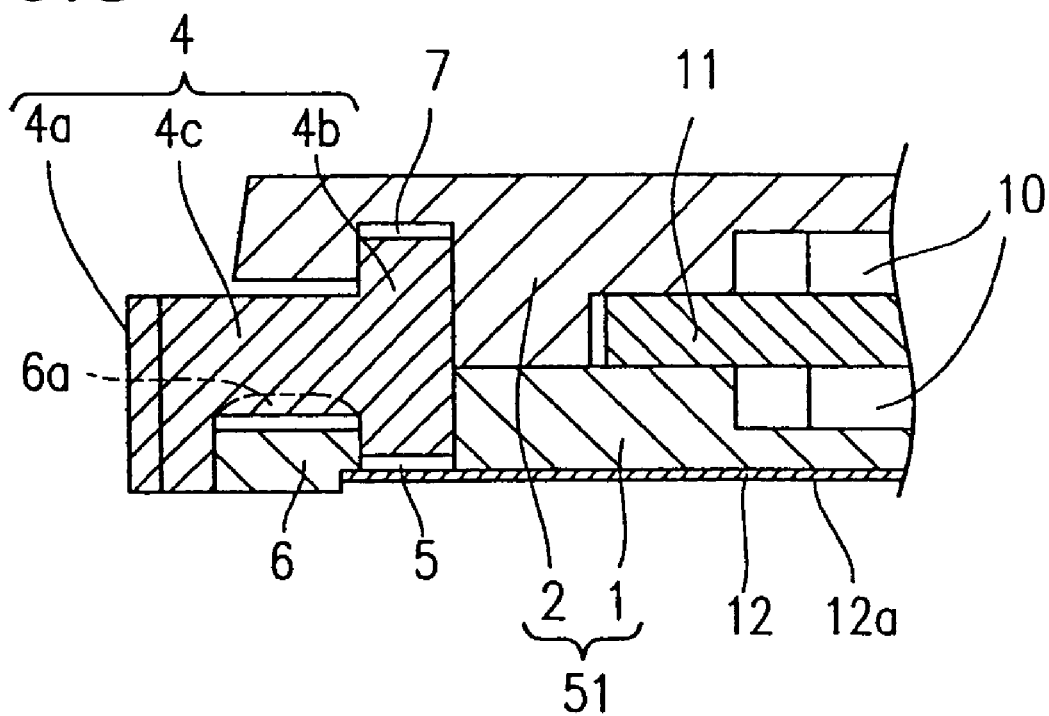
FIG. 5 is a cross-sectional view showing the memory card taken along line A-A in FIG. 1.
Figure 6:
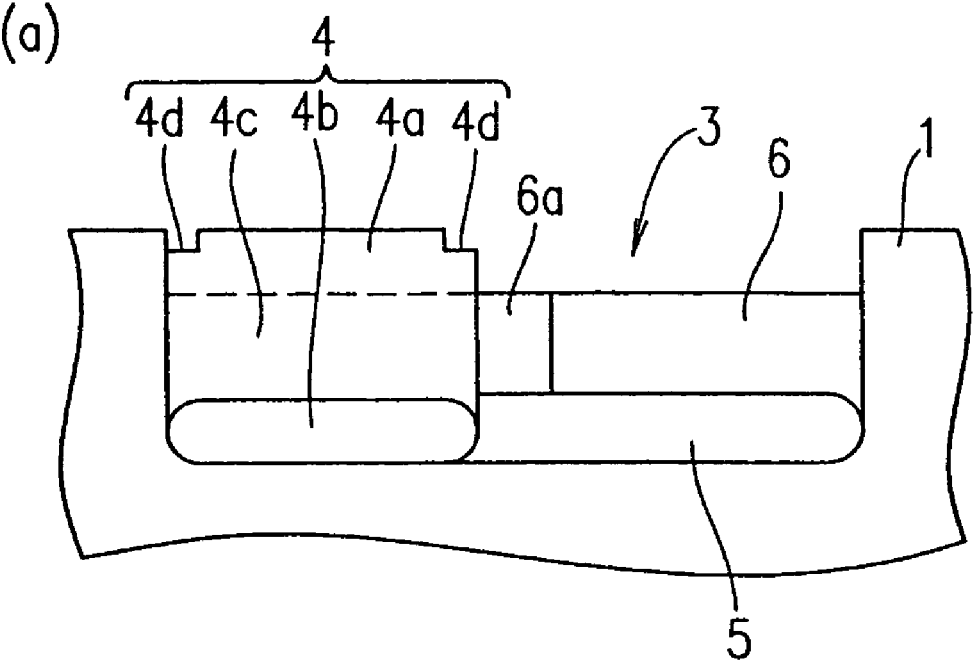
FIG. 6 illustrates manipulation of a write/nonwrite setting element of the memory card according to embodiment 1 of the present invention.
Figure 6:
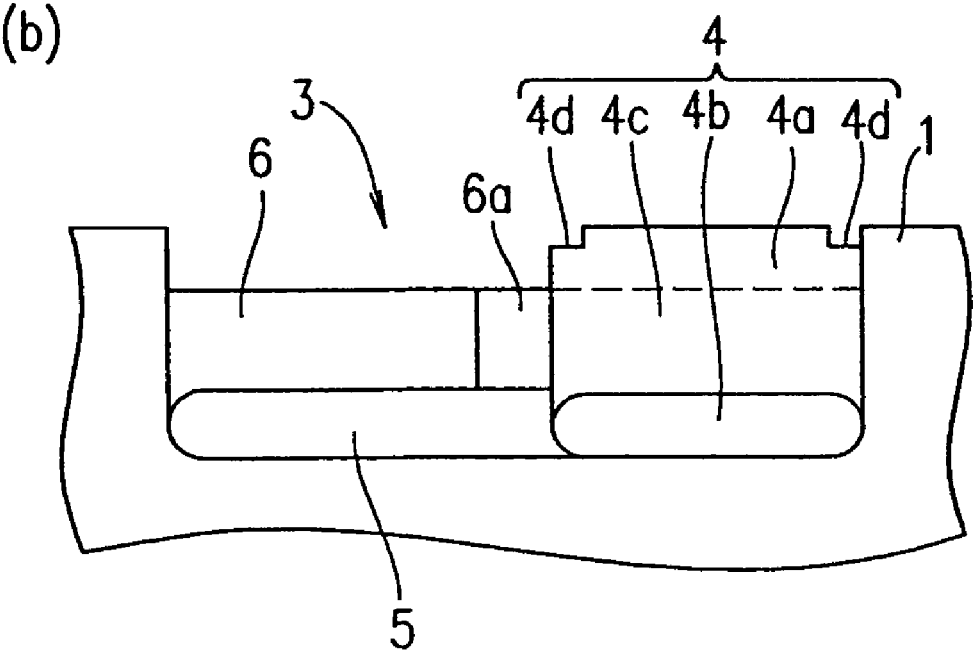
Figure 7:
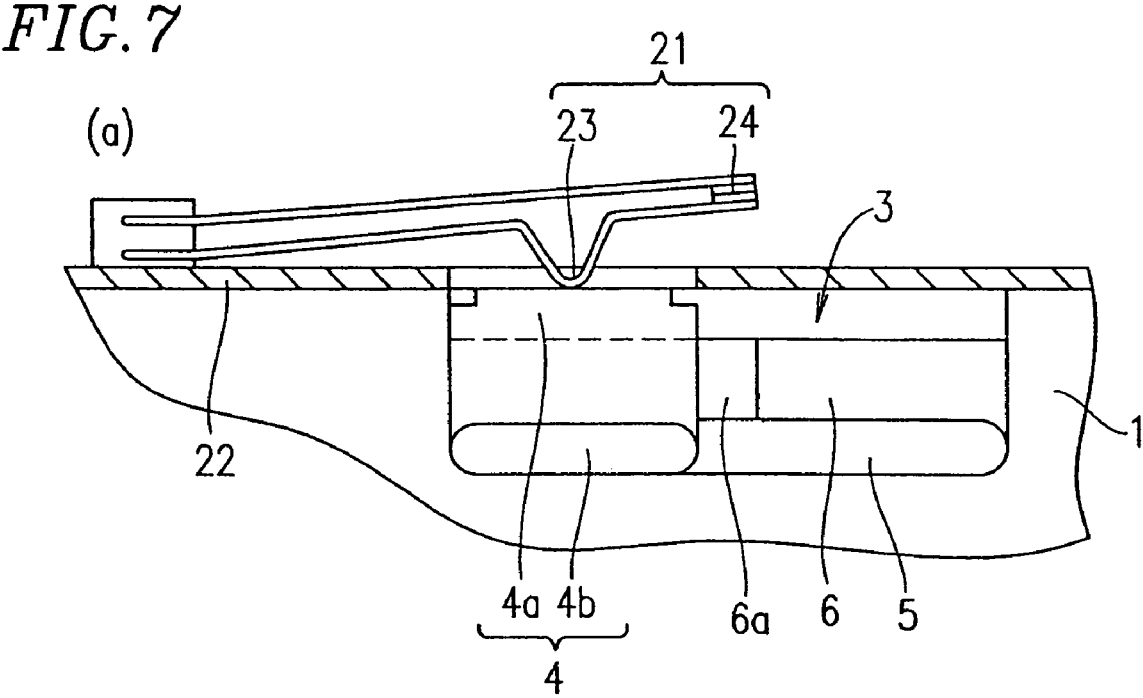
FIG. 7 illustrates detection of the setting of the write/nonwrite setting element of the memory card according to embodiment 1 of the present invention.
Figure 7:
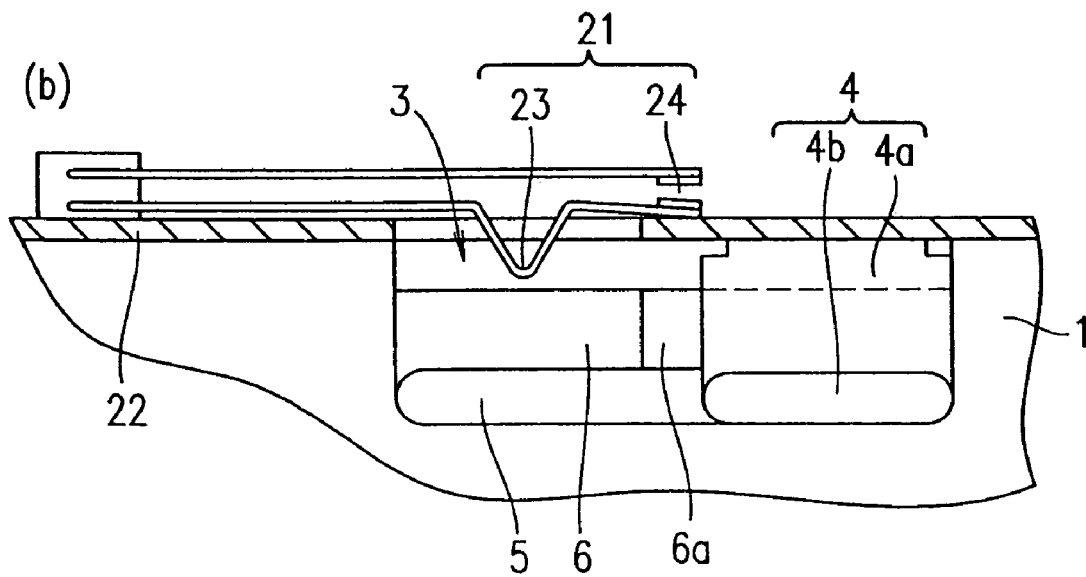

FIG. 1 is a perspective view showing a lower surface side of an assembled memory card 100 according to embodiment 1 of the present invention. FIG. 2 is a perspective view showing the memory card 100 in which a lower main body is partially cut away. FIG. 3 is a perspective view showing an upper surface side of the partially-exploded memory card 100. FIG. 4 is a perspective view showing the memory card 100 in which an upper main body is partially cut away. FIG. 5 is a cross-sectional view showing the memory card 100 taken along line A-A in FIG. 1. FIGS. 6(*a*) and 6(*b*) illustrate manipulation of a write/nonwrite setting element of the memory card 100. FIGS. 7(*a*) and 7(*b*) illustrates detection of the setting of the write/nonwrite setting element in the memory card 100.

In FIGS. 1 through 5, reference numeral 1 denotes an upper main body of the memory card, reference numeral 2 denotes a lower main body of the memory card. A combination of the upper and lower main bodies 1 and 2 forms a main body 51 of the memory card. Herein, the width of the upper main body 1 is greater than that of the lower main body 2. Reference numeral 3 denotes a notched section formed at a side of the wider upper main body 1 of the memory card. The notched section 3 is formed in the shape of a flat rectangular recess. In the notched section 3, a write/nonwrite setting element 4 is slidably provided. Specifically, an elastic guide 6 and a slit 5 are formed in the upper main body 1 of the memory card within the notched section 3, and a groove 7 is formed in the lower main body Z at a position which faces the slit 5. The write/nonwrite setting element 4 is slidably fitted in the slit 5, the groove 7, and the elastic guide 6, and is sandwiched by the upper and lower main bodies 1 and 2 of the memory card. The write/nonwrite setting element 4 is positioned so that a portion of the setting element 4 meets with the notched section 3 formed in the upper main body 1 of the memory card and covers a portion of the notched section 3. Sliding movement of the setting element 4 selects a position at which the notched section 3 is covered.

The write/nonwrite setting element 4 covers a portion of the notched section 3 so as to set the write/nonwrite state of the memory card. The write/nonwrite setting element 4 includes: a manipulation portion 4a used as a shift knob which is manually operated so as to set the write/nonwrite state of the memory card; an anti-disengagement portion 4b which is fitted in the slit 5 and the groove 7; and a slide contact portion 4c which connects the manipulation portion 4a with the anti-disengagement portion 4b and which slidably contacts the elastic guide 6. The write/nonwrite setting element 4 fits in the upper main body 1 of the memory card, in which the slit 5 is formed, and is covered with the lower main body 2 of the memory card, in which the groove 7 is formed, such that the anti-disengagement portion 4b fits in the slit 5 and the groove 7, and the slide contact portion 4c is slidably held between the elastic guide 6 and the lower main body 2 of the memory card.

The elastic guide 6 provided in the upper main body 1 of the memory card has an engagement portion in a substantially central area thereof, which is formed by a protrusion 6a. The slide contact portion 4c of the write/nonwrite setting element 4 is provided so as to ride over the protrusion 6a so as to be engagedly stopped at the opposite sides of the elastic guide 6, thereby selecting a position where the write/nonwrite setting element 4 covers the notched section 3. That is, between the elastic guide 6 formed in the upper main body 1 of the memory card and the write/nonwrite setting element 4, an engagement portion for stopping sliding movement of the write/nonwrite setting element 4 along the elastic guide 6 is provided. With this structure, both a click-feeling and stoppage of write/nonwrite setting can be provided to the sliding movement of the write/nonwrite setting element 4. The click-feeling can be adjusted by changing the protruded amount of the protrusion 6a. In this example, the engagement portion is formed by the protrusion 6a. However, the engagement portion may be structured such that a first engagement portion of a protrusion or cavity is formed in the elastic guide 6, a second engagement portion of a cavity or protrusion is formed in a surface of the slide contact portion 4c of the write/nonwrite setting element 4 which faces the elastic guide 6, and the first engagement portion is engagedly stopped by the second engagement portion during the sliding movement of the write/nonwrite setting element 4. Further, the shape of each of the above components is not limited to that shown in the drawings so long as the components are disengagedly assembled.

In the main body of the memory card, a terminal 9 for establishing an electrical connection with a device is integrally formed in a slit portion 8 of the lower main body 2 of the memory card. Inside the main body, the memory card includes a substrate 11 which has a semiconductor memory 10 mounted thereon having a rewritable content. The content stored in the semiconductor memory 10 is read out or rewritten through the terminal 9 by an electrically-connected device (not shown). The memory card has the write/nonwrite setting means (further described later) for preventing erroneous erasure or erroneous overwriting of a stored content.

Reference numeral 12 denotes a labeling region, which is formed in a surface of the upper main body 1 of the memory card so as to have a recessed shape. As shown in FIG. 5, in the labeling region 12, a label 12a on which predetermined presentation items about the memory card are printed is attached. In this example, the anti-disengagement portion 4b of the write/nonwrite setting element 4 is formed so as not to extend beyond the end edge of the slit 5. With such a structure, the label 12a is prevented from being peeled off. Furthermore, the groove 7 formed in the lower main body 2 is not necessary to be formed in the shape of a slit, and an irregular surface of the upper main body 1 is hidden without deteriorating the guiding function due to the label 12a attached over the slit 5. Thus, the appearance of the memory card is not deteriorated.

A function of the memory card having the above structure is described below.

The write/nonwrite setting element 4 is sandwiched, together with the substrate 11 having the semiconductor memory 10 mounted thereon, by the upper main body 1 and the lower main body 2 of the memory card, whereby the write/nonwrite setting element 4 is held in the main body assembly 51 of the memory card. The write/nonwrite setting element 4 is held at a predetermined position between the upper main body 1 and the lower main body 2 of the memory card such that the setting element 4 can be guided by the slit 5, the elastic guide 6, and the groove 7. The circumferences of the upper main body 1 and the lower main body 2 of the memory card are welded or adhered to each other except for the notched section 3.

In this way, the write/nonwrite setting element 4 is provided so as to be held between the upper main body 1 and the lower main body 2 of the memory card, so that the manipulation portion 4a thereof covers a portion of the notched section 3. As shown in FIGS. 6(*a*) and 6(*b*), substantially a right or left half of the notched section 3 is covered. In FIG. 6(*a*), the left half is covered, and the covered portion has a generally integral shape with the external shape of the upper main body 1 of the memory card. The uncovered, remaining right half of the notched section 3 forms a flat rectangular recess in the main body of the memory card. By the rightward sliding movement of the write/nonwrite setting element 4, the slide contact portion 4c of the write/nonwrite setting element 4 rides over the protrusion 6a of the elastic guide 6, and the setting element 4 is stopped at the right side of the elastic guide 6 so that the right half of the notched section 3 is covered as shown in FIG. 6(*b*). As the write/nonwrite setting element 4 rides over the protrusion 6a, the elastic guide 6 is deformed. A position of the notched section 3 which is to be covered with the write/nonwrite setting element 4 is selected by the sliding movement of the setting element 4, whereby the write/nonwrite state of data in the memory card is set.

Manipulation for setting the write/nonwrite state of data in the memory card is performed by holding the manipulation portion 4a between the fingers of a user and sliding rightward or leftward. The write/nonwrite setting element 4 is slid while the elastic guide 6 is bent due to the protrusion 6a. As a result, an appropriate click-feeling is provided, and an unintentional sliding movement of the write/nonwrite setting element 4 is prevented. Furthermore, a rectangular recessed portion of the notched section 3 which is not covered with the write/nonwrite setting element 4 provides an indicator function, with which the setting status about the write/nonwrite state of data in the memory card can be visually confirmed in an apparent manner. Further, two corners of the manipulation portion 4a of the write/nonwrite setting element 4 are provided with stepped portions 4d. When the setting element 4 is positioned at one side of the notched section 3, one of the stepped portions 4d and the upper main body 1 of the memory card together form a minute reentrant portion, in which a finger or a finger nail of a user can be readily engaged.

Next, how a device in which a memory card is insertively connected detects the setting of write/nonwrite state of the memory card according to the present invention is described with reference to FIGS. 7(a) and 7(b).

In FIG. 7(a), reference numeral 22 denotes a device in which a memory card of this embodiment is insertively connected. Reference numeral 21 denotes a detection switch provided in the device 22. The detection switch 21 includes a detection section 23 and a contact-point element 24. In FIG. 7(a), the write/nonwrite setting element 4 covers the left half of the notched section 3, as shown in FIG. 6(a), and it is assumed that the memory card is writable when the write/nonwrite setting element 4 is placed at the left side of the notched section 3. In this writable setting where the write/nonwrite setting element 4 covers the left half of the notched section 3, the detection section 23 of the detection switch 21 is raised so that the contact-point element 24 is closed. The device 22 detects that the contact-point element 24 is closed, thereby recognizing that the memory card is writable.

Alternatively, as shown in FIG. 7(b), the memory card is nonwritable when the write/nonwrite setting element 4 is placed at the right side of the notched section 3. In this nonwritable setting where the left half of the notched section 3 is not covered with the write/nonwrite setting element 4, the detection section 23 of the detection switch 21 is not raised so that the contact-point element 24 is open. The device 22 detects that the contact-point element 24 is open, thereby recognizing that the memory card is nonwritable.

Embodiment 2

Figure 8:
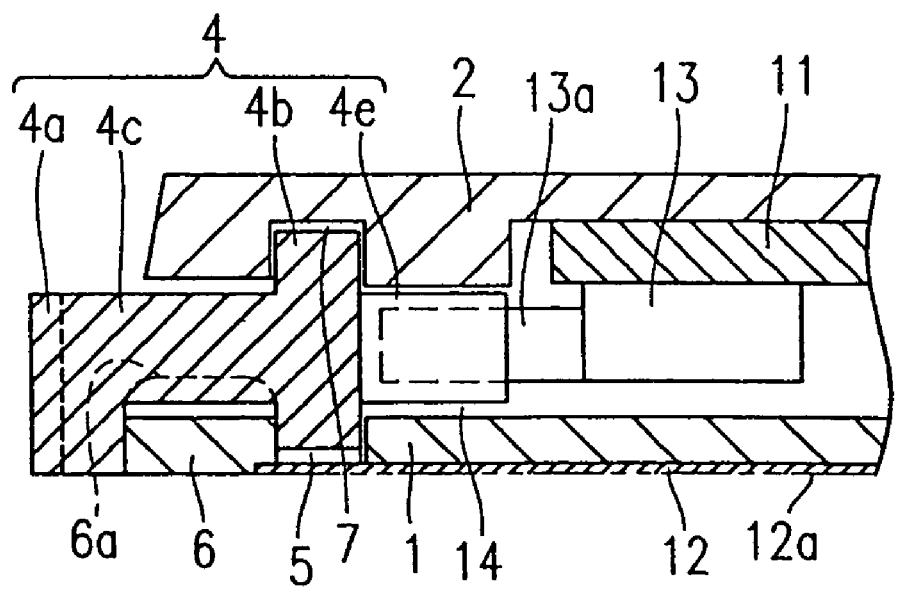
FIG. 8 shows a cross-section of a memory card according to embodiment 2 of the present invention.

Next, embodiment 2 of the present invention is described with reference to FIG. 8. FIG. 8 shows a cross-section of a memory card incorporating a switch according to embodiment 2 of the present invention.

The basic structure of the memory card of embodiment 2 is the same as that of the memory card of embodiment 1. As shown in FIG. 8, a switch 13 is mounted on a substrate 11 which is provided inside the memory card, and the switch 13 has an activation portion 13a which extends toward the write/nonwrite setting element 4. The write/nonwrite setting element 4 has an operation portion 4e, which is placed so as to engage with the activation portion 13a of the switch 13. In order to accommodate the above elements, a space 14 is provided between the upper main body 1 and the lower main body 2 of the memory card, in which the operation portion 4e and the activation portion 13a are slid or moved. With such a structure, the write/nonwrite state of the memory card can be set both by a sliding movement of the write/nonwrite setting element 4 and by an electrical switching performed inside the main body of the memory card.

Embodiment 3

Figure 9:
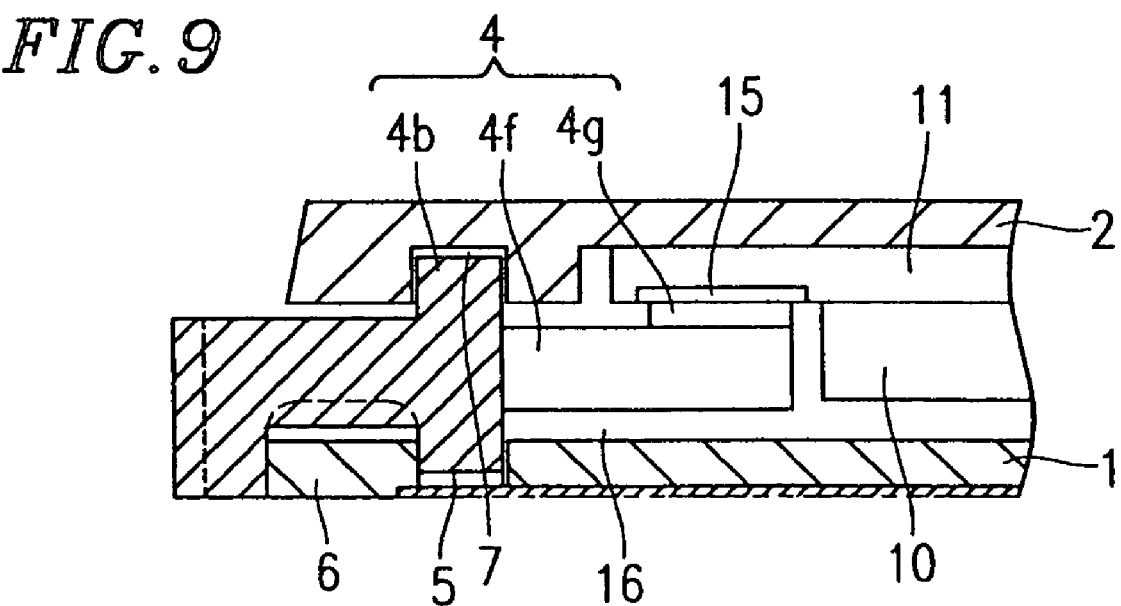
FIG. 9 shows a cross-section of a memory card according to embodiment 3 of the present invention.

Next, embodiment 3 of the present invention is described with reference to FIG. 9. FIG. 9 shows a cross-section of a memory card incorporating a contact section according to embodiment 3 of the present invention.

The basic structure of the memory card of embodiment 3 is the same as that of the memory card of embodiment 1. As shown in FIG. 9, a contact section 15 is provided on a substrate 11 which is provided inside the memory card, and a write/nonwrite setting element 4 is provided with a contact piece holding section 4f and a contact piece 4g. Between the upper main body 1 and the lower main body 2 of the memory card, a slide space 16 is provided in which the contact piece holding section 4f and the contact piece 4g are slid. With such a structure, the write/nonwrite state of the memory card can be set both by a sliding movement of the write/nonwrite setting element 4 and by an electrical switching performed inside the main body of the memory card.

Embodiment 4

Figure 10:
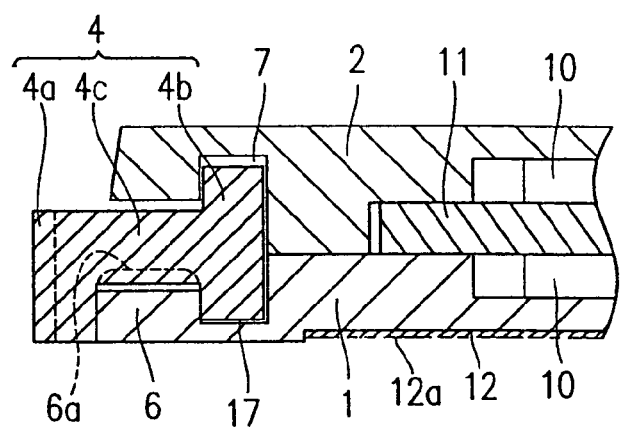
FIG. 10 shows a cross-section of a memory card according to embodiment 4 of the present invention.

Next, embodiment 4 of the present invention is described with reference to FIG. 10. FIG. 10 shows a cross-section of a portion of a memory card according to embodiment 4 of the present invention, in which a write/nonwrite setting element 4 is provided.

The basic structure of the memory card of embodiment 4 is the same as that of the memory card of embodiment 1. In embodiment 4, as shown in FIG. 10, the upper main body 1 of the memory card has a reentrant groove 17 in place of the slit 5 of FIG. 1. The anti-disengagement portion 4b of the write/nonwrite setting element 4 fits in the reentrant groove 17 and the reentrant groove 7 formed in the lower main body 2 of the memory card.

In each of the above-described embodiments, the size of the slit 5, the depth of the reentrant groove 7 or 17, the thickness of the elastic guide 6, and the height of the protrusion 6a may be suitably set, in consideration of a material of the upper and lower main bodies 1 and 2 and the write/nonwrite setting element 4, such as a synthetic resin or the like, according to the elastic strength of these elements obtained during a sliding movement, and the setting of a suitable click-feeling, etc.

Embodiment 5

Figure 11:
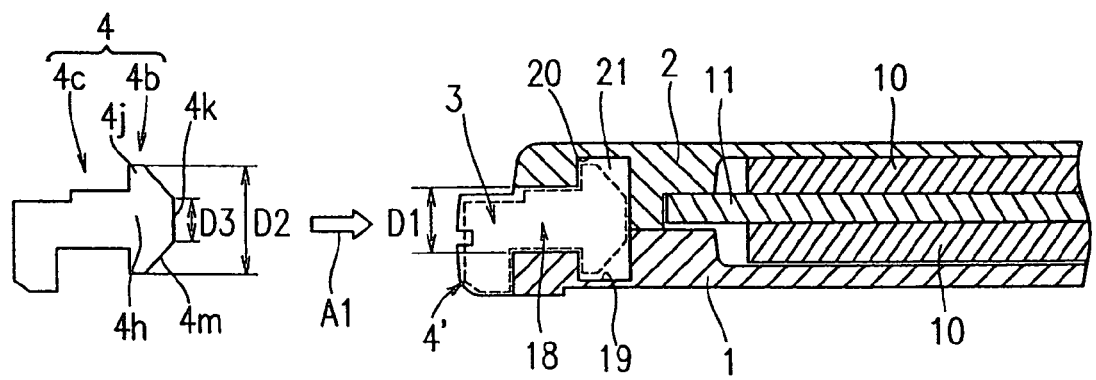
FIG. 11 is a cross-sectional view showing a portion of a memory card according to embodiment 5 of the present invention, to which a write/nonwrite setting element is provided.
Figure 12:
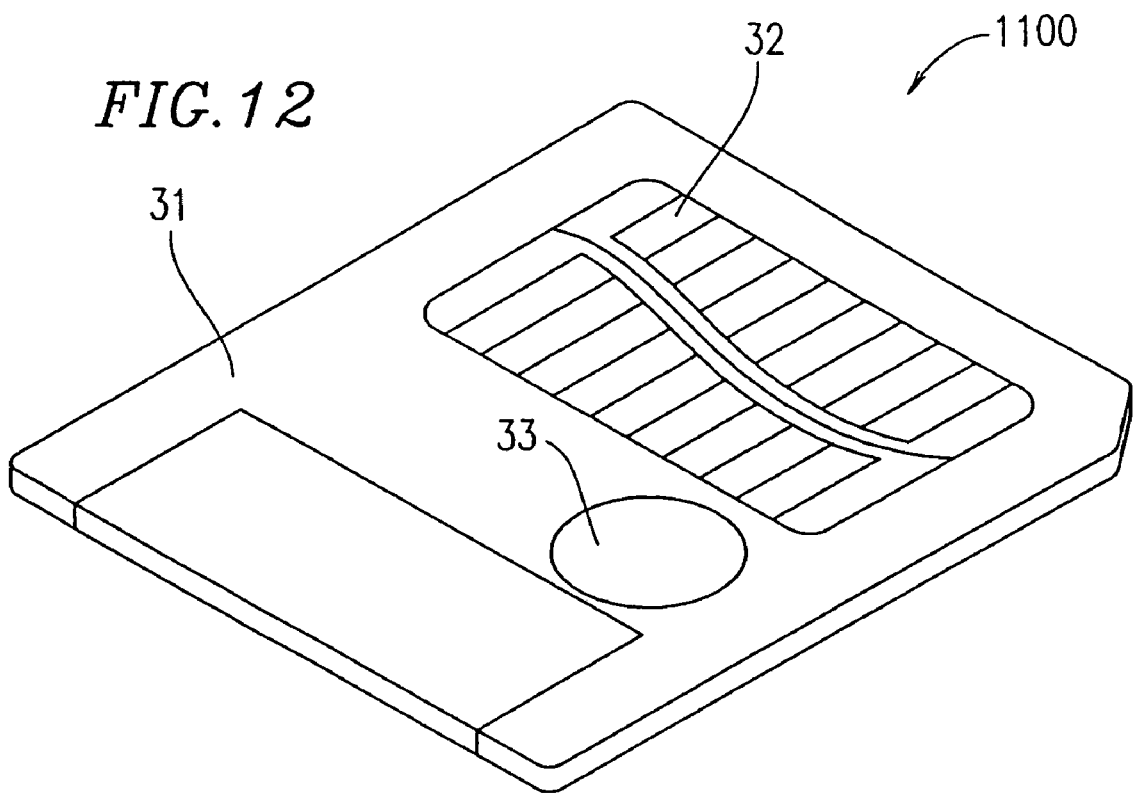
FIG. 12 is a perspective view showing a conventional memory card incorporating a write/nonwrite setting means which is realized by a reflective sheet.
Figure 13:
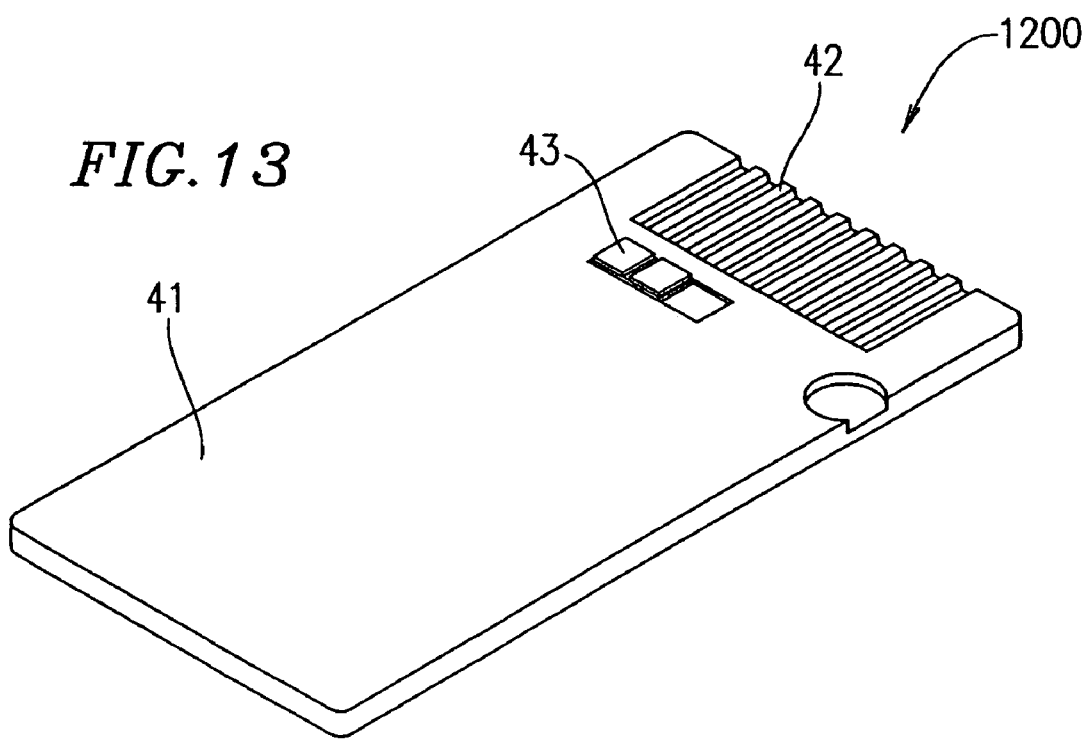
FIG. 13 is a perspective view showing a conventional memory card incorporating a write/nonwrite setting means which is realized by a switch.

Next, embodiment 5 of the present invention is described with reference to FIG. 11. FIG. 11 shows a cross-section of a portion of a memory card according to embodiment 5 of the present invention, in which a write/nonwrite setting element is provided.

Upper and lower main bodies 1 and 2 of the memory card together form a slide hole 18 within the notched section 3. Inside the slide hole 18, grooves 19 and 20 are formed in the upper and lower main bodies 1 and 2 of the memory card, respectively. The grooves 19 and 20 function as elastic guides, which utilize elastic deformation of the upper and lower main bodies 1 and 2. The upper and lower main bodies 1 and 2 are combined integrally by ultrasonic welding or the like as shown in FIG. 11. From being combined, the slide hole 18 is formed within the notched section 3 so as to be open against a side face of the memory card. An engagement portion 21 is formed in the groove 20. The engagement portion 21 serves for the positioning of a write/nonwrite setting element 4 during a sliding movement thereof, which will be described later.

The write/nonwrite setting element 4 has a fitting portion 4h which fits in the grooves 19 and 20 when the setting element 4 is inserted into the slide hole 18 formed by the upper and lower main bodies 1 and 2 of the memory card.

Width D2 of a maximum width section 4j of the fitting portion 4h is greater than width D1 of the slide hole 18. Width D3 of a tip section 4k of the fitting portion 4h is smaller than width D1 of the slide hole 18. The fitting portion 4h has an inclined face 4m extending from the tip section 4k to the maximum width section 4j.

As shown in FIG. 11, the write/nonwrite setting element 4 is forcedly inserted into the slide hole 18 along the direction indicated by arrow A1, so as to fit in the grooves 19 and 20. During insertion of the setting element 4, the inclined face 4m expands the slide hole 18 formed by the upper and lower main bodies 1 and 2 of the memory card. The write/nonwrite setting element 4 is further inserted, while the upper and lower main bodies 1 and 2 are elastically deformed, until the fitting portion 4h fits in the grooves 19 and 20.

After the write/nonwrite setting element 4 has been fitted in the memory card, the write/nonwrite setting element 4 is positioned by means of the engagement portion 21 formed in the grooves 19 and 20 in a similar manner described in conjunction with the memory cards of the previous embodiments.

INDUSTRIAL APPLICABILITY

As described above, according to the present invention, a write/nonwrite setting element is slidably fitted in a notched section provided at a side portion of a main body of a memory card. Setting of the write/nonwrite state of the memory card is achieved by selecting a portion of the notched section which is covered with the write/nonwrite setting element by means of a sliding movement of the write/nonwrite setting element. In such a structure, the memory card does not have any protrusion over its side face, and the thickness of the memory card is maintained so as to be thin. Due to such a structure, setting of the write/nonwrite state of the memory card is achieved by changing the state of the notched section by means of simple manipulation, i.e., by simply sliding the write/nonwrite setting element. Furthermore, the write/nonwrite setting element can be securely held in the main body of the memory card. Since the notched section and the write/nonwrite setting element are provided on a side face of the main body of the memory card, a relative effective area on the memory card for incorporating a semiconductor memory or the like can be increased. As a result, the size of the entire memory card can be decreased.

Furthermore, a switch, a contact-point element, etc., can be provided inside the main body of the memory card for setting the write/nonwrite state of the memory card, only by making a simple change to the shape of the memory card structure. That is, a high degree of freedom is provided in the entire memory card structure. Furthermore, since the notched section and the write/nonwrite setting element are provided on a side face of the main body of the memory card, a relative effective area on the memory card for incorporating a semiconductor memory or the like can be increased. As a result, the size of the entire memory card can be decreased.

The invention claimed is:

1. A memory card system, comprising:
    a memory card having a setting element which moves to expose either of two paths extending from above said memory card to below said memory card;
    a detector which detects which of said two paths is exposed by and which of said two paths is blocked by a solid interior portion of said setting element, a first of said paths exposed indicating that writing to said memory card is permitted, a second of said paths exposed indicating that writing to said memory card is prohibited;
    said memory card having a recessed rectangular notch along an edge of said memory card, said setting element sliding in said recessed rectangular notch to expose either of said two paths, said either of said two paths corresponding to either of two unblocked remaining portions of said recessed rectangular notch, said first of said paths corresponding to a first of said unblocked remaining portions, and said second of said paths corresponding to a second of said unblocked remaining portions.

2. A method of using a memory card, said method comprising the steps of:
    detecting which of two paths extending from above said memory card to below said memory card is exposed by a movable setting element which slides in a recessed rectangular notch along an edge of said memory card to expose either of said two paths, said either of said two paths corresponding to either of two unblocked remaining portions of said recessed rectangular notch, said first of said paths corresponding to a first of said unblocked remaining portions, and said second of said paths corresponding to a second of said unblocked remaining portions;
    permitting writing to said memory card if one of said paths is exposed;
    prohibiting writing to said memory card if said one of said paths is blocked by a solid interior portion of said setting element while another of said paths is exposed.

3. Apparatus for use with a memory card, comprising:
    a container for holding said memory card; and
    a detector for detecting which of two paths extending from above said memory card to below said memory card is exposed by a movable setting element with a solid interior portion, detection of a first of said paths exposed indicating that writing to said memory card is permitted, detection of said first of said paths blocked by said solid interior portion of said movable setting element and a second of said paths exposed indicating that writing to said memory card is prohibited,
    said detector positioned for detection of said first and second paths in a recessed rectangular notch along an edge of said memory card, said setting element sliding in said recessed rectangular notch to expose either of said two paths, said either of said two paths corresponding to either of two unblocked remaining portions of said recessed rectangular notch, said first of said paths corresponding to a first of said unblocked remaining portions, and said second of said paths corresponding to a second of said unblocked remaining portions.

* * * * *